United States Patent [19]

Sugisaki et al.

[11] 4,123,327
[45] Oct. 31, 1978

[54] FUEL ASSEMBLY FOR A NUCLEAR REACTOR

[75] Inventors: Toshihiko Sugisaki; Tetsuo Horiuchi; Hideo Ogasawara; Shozo Yamanari; Kenji Tominaga, all of Hitachi, Japan

[73] Assignee: Hitachi, Ltd., Japan

[21] Appl. No.: 689,817

[22] Filed: May 25, 1976

[30] Foreign Application Priority Data

May 30, 1975 [JP] Japan ................................. 50/64353

[51] Int. Cl.² ............................................. G21C 3/02
[52] U.S. Cl. .................................................... 176/76
[58] Field of Search ................. 176/37, 38, 50, 54–56, 176/76, 78, 61

[56] References Cited

U.S. PATENT DOCUMENTS

| | | | |
|---|---|---|---|
| 3,445,334 | 5/1969 | Humphries, Jr. | 176/86 R X |
| 3,466,226 | 9/1969 | Lass | 176/78 |
| 3,481,833 | 12/1969 | Germond et al. | 176/86 R |
| 3,715,274 | 2/1973 | Venier | 176/76 X |
| 3,736,226 | 5/1973 | Sakurama | 176/50 |
| 3,849,257 | 11/1974 | Bevilacqua | 176/86 R X |
| 3,928,131 | 12/1975 | Wachter et al. | 176/78 |
| 3,988,203 | 10/1976 | Kuzavkov et al. | 176/36 R X |

*Primary Examiner*—Peter A. Nelson
*Attorney, Agent, or Firm*—Craig & Antonelli

[57] ABSTRACT

Fuel assemblies forming the core of a nuclear reactor each include an open-ended tubular channel, upper and lower tie plates formed therein with a multitude of through holes and arranged in the vicinity of upper and lower ends of the tubular channel respectively, and elongated fuel elements located parallel to one another and extending between the upper and lower tie plates. The channel of each fuel assembly is formed in its walls with openings which are disposed below the upper tie plate and above the upper end edge of the fuel of each fuel element.

9 Claims, 4 Drawing Figures

FUEL ASSEMBLY FOR A NUCLEAR REACTOR

BACKGROUND OF THE INVENTION

This invention relates to a fuel assembly of an improved construction for a nuclear reactor.

The core of a boiling-water reactor is generally located in a housing within a pressure vessel. The core is constructed such that a coolant can flow in the direction of the axis of the housing, with the core being generally immersed in a pool of coolant during normal operation of the reactor.

During normal operation of a boiling-water reactor, the coolant is caused to circulate in the pressure vessel by a coolant circulating device.

A spray cooler is provided in an upper space of the housing by way of precaution against an accident involving leaks of the coolant from the pressure vessel due to a failure of the coolant circulating device. In the event that such accident occurs, a coolant is sprayed on to the entire surface of the core. The pressure vessel is enclosed in an airtight sealed dry well.

The prior art patents include U.S. Pat. Nos. 3,350,275 and 3,338,991 wherein the detailed construction of the core or the fuel assemblies is described.

In the event that an accident involving a failure of the coolant circulating device occurs, problems described hereinafter will arise:

(1) Upon occurrence of such accident, the coolant in which the core is immersed will leak out into the dry well in several scores of seconds, and spraying of the coolant by the spray cooler will be initiated. The coolant which is sprayed will be heated and vaporized by the decay heat of the fuel in the core and the vapor will flow upwardly, thereby suppressing the inflow of additional coolant into the core and reducing the quantity of the coolant flowing downwardly through the core.

(2) Thus, the coolant sprayed will pass through passages other than that of the core which offer greater resistance to its flow than the core, before being collected in the bottom of the pressure vessel. Accordingly, it takes time for the core to be immersed in a pool of coolant again.

(3) The nuclear fuel is encased in a clad tube made of a zirconium alloy. However, if there is any delay in cooling the clad tube by bringing the same into contact with a sprayed coolant as described in paragraphs (1) and (2), there will be the hazard of the clad tube losing its heat resisting strength because of its temperature exceeding 800° C. and reaching the embrittling temperature of 1200° C. due to decay heat.

Also, during normal operation of a nuclear reactor, the following problem will be encountered:

(1) There is a difference in the resistance offered to the flow of the coolant between the central portion of the core and the peripheral portion thereof. Particularly, when it is necessary to locally change the number of fuel elements contained in the fuel assemblies, the flow rate of the coolant flowing through the core will become unbalanced from portion to portion.

(2) As a result, the power distribution in the core will become non-uniform.

SUMMARY OF THE INVENTION

Accordingly, an object of the invention is to provide a fuel assembly wherein it is possible to increase the volume per unit hour of the coolant flowing between the clad tubes constituting the fuel elements after the coolant has been sprayed onto the core in the event that an accident involving the leaks of the coolant from the pressure vessel occurs.

Another object of the invention is to provide a fuel assembly wherein it is possible to reduce the time required for the core to be immersed again in a pool of coolant after the spray coolant is sprayed onto the core in the event that an accident involving the leaks of the coolant out of the pressure vessel occurs.

Still another object of the invention is to provide a fuel assembly wherein a break of the clad tubes constituting fuel elements due to embrittlement thereof can be avoided in the event that an accident involving the leaks of the coolant from the pressure vessel occurs.

Still another object of the invention is to provide a fuel assembly which makes it possible to render uniform the flow rate of the coolant through the core during steady state operation of a nuclear reactor.

A further object of the invention is to provide a fuel assembly which makes it possible to render uniform the power distribution in the core during steady state operation of a nuclear reactor.

According to a feature of the present invention, there is provided means whereby the vapor can be bypassed which vapor is produced in the core as the coolant sprayed onto the core is heated by the core in the event that an accident involving the leaks of the coolant from the pressure vessel occurs.

According to another feature of the invention, there is provided means whereby the flow of the coolant moving through each fuel assembly can be bypassed during steady state operation of a nuclear reactor.

The outstanding characteristic of the invention is that openings are formed in all the wall surfaces of the channel for causing the coolant to bypass the channel, such openings being located in a position which is below the underside of the upper tie plate and above the upper end edge of the fuel elements.

We have found that, when water is used as coolant and sprayed onto the core of a nuclear reactor to effect emergency core cooling, the flow of water into the reactor core can be facilitated by removing from the channels the steam which is produced within the channels as the water is brought into contact with the clad tubes constituting fuel elements.

The results of experiments show that, when the quantity of steam flowing upwardly from a channel, the quantity of water sprayed onto the channel and the total area of the through holes formed in the upper tie plate are denoted by $W_g(m^3/sec)$, $W_f(m^3/sec)$ and $A(m^2)$ respectively, then the following relation holds:

$$\sqrt{\frac{W_g}{A}} + C_1 \sqrt{\frac{W_f}{A}} = C_2$$

where $C_1$ and $C_2$ are constants.

This formula shows that an increase in the rate of flow $W_g/A$ of the steam flowing upwardly through a channel results in a decrease in the flow rate $W_f$ as spray water passing through the through holes of the channel.

To prevent this suppression phenomenon of spray water inflow into the channel, one has only to reduce the rate of flow of the steam passing through the through holes in the upper tie plate. To this end, a plurality of openings are formed in the walls of the channel in a position which is below the upper tie plate and above the upper end edge of the fuel elements in accordance with this invention.

DESCRIPTION OF THE PREFERRED EMBODIMENT

Figure 1:
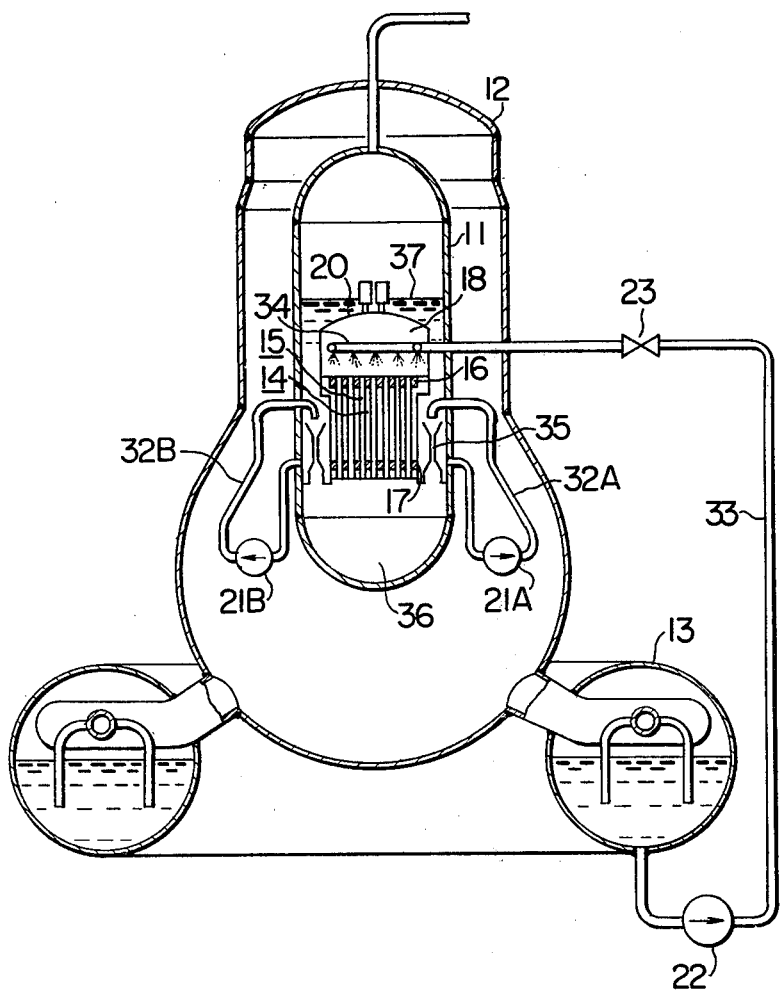
FIG. 1 is a schematic view of a boiling-water reactor to which this invention is applicable.

Referring to FIG. 1, a dry well 12 is an airtight sealed vessel including a bottom portion which communicates with a suppression chamber 13 of tubular ring shape having a large quantity of coolant stored therein. A pressure vessel 11 of a capsule shape is enclosed by the dry well 12, and a reactor core 14 is enclosed by the pressure vessel 11.

The reactor core 14 comprises a housing 20 which is open at the bottom, a plurality of fuel assemblies 15 arranged parallel to the axis of the housing 20, and an upper grid plate 16 and a lower grid plate 17 holding upper and lower ends respectively of the fuel assemblies 15 and secured to the housing 20, said upper and lower grid plates being formed therein with a multitude of small apertures for permitting the coolant to pass therethrough.

During normal operation of the reactor, the reactor core 14 is immersed in a pool of coolant. In the figure, the reference numeral 37 designates a liquid level of the coolant.

In order to cause the coolant to circulate from a bottom 36 of the pressure vessel 11 toward the core 14 in the pool of coolant in which the core 14 is immersed, a jet pump 35 is disposed in the pressure vessel 11, while circulating pumps 21A and 21B and circulating pipings 32A and 32B are disposed in the dry well 12.

Meanwhile, by way of precaution against an accident involving the leaks of the coolant from the pressure vessel 11, there is provided, in an upper plenum 18 of the housing 20, a spray cooler 34 which is connected to the suppression chamber 13 through spray piping 33 mounting therein an injection pump 22 and a check valve 23, as a means of emergency core-cooling which sprays the coolant in the suppression chamber 13 onto the core 14 from above in the event of such an accident.

Figure 2:
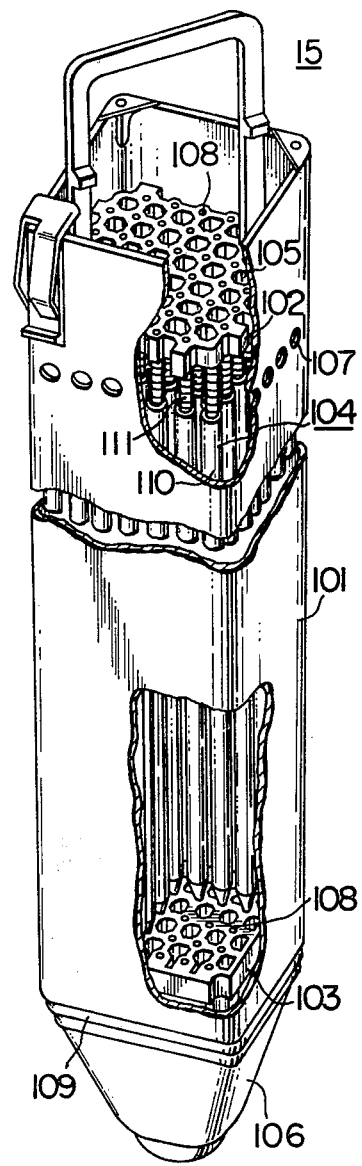
FIG. 2 is a perspective view, with certain parts being shown in section, of the fuel assembly comprising one embodiment of the invention.

FIG. 2 is a perspective view of the fuel assembly comprising one embodiment of the invention. The fuel assembly 15 comprises an open-ended channel 101 of a substantially square shape in cross-section which has an upper tie plate 102 and a lower tie plate 103 secured in the walls of the channel 101 and disposed near the upper and lower ends thereof in such manner as to extend from wall to wall within the channel 101.

The upper and lower tie plates 102 and 103 are each formed therein with a multitude of through holes 105 of the same dimension arranged in a grid pattern. A plurality of cavities 108 are provided in the upper and lower tie plates 102 and 103 in such a manner that each cavity 108 is located in each cross-point of the grid. The lower tie plate 103 forms a unitary structure with a funnel-shaped portion 106 which is connected to the lower open end portion of the channel 101 by a flange 109.

Arranged between the upper and lower tie plates 102 and 103 and disposed parallel to one another are a plurality of fuel elements 104 each of which has upper and lower ends fitted in the cavities 108 provided in the upper and lower tie plates 102 and 103 respectively. Each fuel element 104 comprises a clad tube 110, and a number of fuel pellets (not shown) packed in the clad tube 110. Each fuel element 104 includes an upper end portion which is in the form of a rod 111 smaller in diameter than the tube 110 and connected to the clad tube 110.

A plurality of openings 107 are formed in each wall of the channel 101 in a position which is below the underside of the upper tie plate 102 and above the upper end surfaces of the fuel pellets of the fuel elements 104. In the embodiment shown and described herein, the openings 107 are in the form of circular holes of the same diameter and disposed horizontally in a row in each of four walls of the channel 101 and equidistantly spaced apart from one another. Each wall has the same number of openings 107.

The reason why the openings 107 are located in a position which is not in the same level as the fuel pellets in the clad tubes 110 is as follows. Generation of voids in the coolant causes changes in the density of coolant and hence the reactivity of the fuel pellets. This fact is utilized for effecting control of the nuclear reactor. However, if the voids are removed midway of the fuel pellets, it would be impossible to utilize changes in reactivity for effecting control of the fuel pellets disposed above the position in which removal of the voids is carried out.

It is for the purpose of avoiding the occurrence of vibration of the fuel elements 104 due to the flow of the fluid bypassing the channel 101 and passing through the openings 107 that the same number of holes of the same diameter are formed in the four walls in the same level and at the same interval.

Operation of the openings 107 provided by the invention will now be described with reference to FIG. 1 and FIG. 2. When an accident involving a failure of the circulating pumps 21A and/or 21B or a break in the circulatory piping 32A and 32B occurs, the coolant in which the core 14 is immersed leaks out into the dry well 12 in several scores of seconds, with a result that the core 14 is heated by the decay heat without being cooled by the coolant in which it has been immersed up to then. At this time, if the pressure in the pressure vessel 11 is lowered and goes down below about 10 kg/cm$^2$, the check valve 23 will open and the injection pump 22 will be actuated. The injection pump 22 supplies the coolant stored in the suppression chamber 13 to the spray cooler 34 which will spray the coolant onto the core 14.

The coolant sprayed by the spray cooler 34 passes through the through holes 105 formed in the upper tie plate 102 of each fuel assembly 15 and produces vapor upon being brought into contact with the clad tubes 110 heated by the decay heat. The vapor is bypassed through the openings 107 and removed from the channel 101. Thus, the bypassing of the vapor through the openings 107 has the effect of efficiently preventing the buildup of steam pressure in the upper portion of each channel 101 below the upper tie plate 102 which would prevent the introduction of further spray coolant through the through holes 105 into the channel 101.

The results of experiments show that, when water is used as the coolant, the total area of the openings 107 should lie within the range between 1/10 and 1/5 of the total area of the through holes 105 in the upper tie plate 102 of the channel 101. It has been ascertained that, if the area ratio of the openings 107 is below the lower limit 1/10, then the steam is not removed satisfactorily therethrough, and that if the area ratio is above the upper limit 1/5, a problem involving the mechanical strength of the channel 101 arises.

Figure 3:
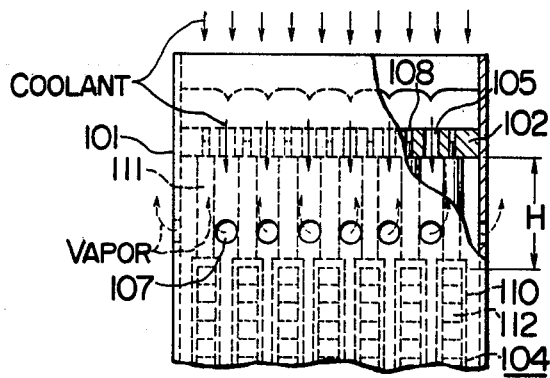
FIG. 3 is a schematic view of the upper portion of the fuel assembly shown in FIG. 2, in explanation of the function of the openings formed in the walls of the fuel assembly.

FIG. 3 shows the behavior of the coolant and the vapor in the case of channel 101 formed with the openings 107 according to the invention and having fuel pellets 112.

The position in which the openings 107 are located is confined to a zone indicated by the symbol H. More specifically, the upper limit of the position is the underside of the upper tie plate 102, while the lower limit thereof is the upper end edge of a fuel pellet 112 in the upper-most layer of each fuel element 104 packed in the clad tube 110.

The spray coolant passes through the through holes 105 and generates vapor by being heated by contact with heated clad tubes 110. In accordance with the invention, the vapor is withdrawn from each channel 101 by bypassing through the openings 107.

Almost all the vapor generated by the heating the spray coolant with the heated clad tubes 110 is withdrawn from the channel 101 as aforesaid. The result of this is that the occurrence of what is referred to as a flooding phenomenon, in which the vapor obturates the through holes 105 and blocks the passage of the spray coolant, can be prevented. Thus, the flow rate of the spray coolant flowing downwardly between the fuel elements 104 in the event that an accident occurs is greater than would be the case if there were no openings 107 formed in the walls of each channel 101.

Figure 4:
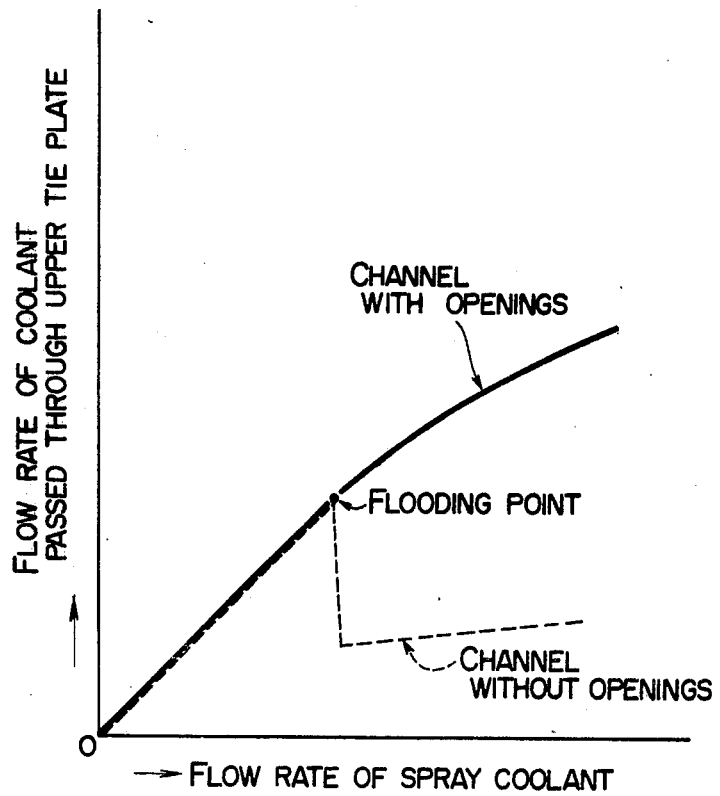
FIG. 4 is a graph showing the relation between the flow rate of coolant supplied by the spray cooler and the flow rate of coolant passing through the through holes formed in the upper tie plate of a fuel assembly.

FIG. 4 is a graph showing the relation between the flow rate of a coolant supplied by the spray cooler 34 and the flow rate of a coolant flowing through the through holes 105 formed in the upper tie plate 102 of each fuel assembly 15. It will be seen that, when the flow rate of the coolant sprayed increases, all the spray coolant will pass through the through holes 105 in the upper tie plate 102 until the flooding point is reached, if the channel 101 is formed with the openings 107. However, in the case of a channel having no openings 107, the quantity of spray coolant passing through the through holes 105 suddenly decreases when the flooding is reached, due to the flow suppressing function of the vapor generated in the channel 101, and the quantity of coolant passing through the through holes 105 thereafter shows almost no increase even if the quantity of spray coolant increases.

It will be appreciated that when the present invention is incorporated in the fuel assemblies, almost all the vapor generated is removed from the channel 101 through the openings 107 formed in the walls thereof as shown in FIG. 3. As a result, the volume per unit hour of spray coolant passing through the through holes 105 increases.

As shown in a solid line in FIG. 4, the quantity of coolant passing through the through holes 105 continues to increase after the flooding point is reached, although the rate of its increase shows a slight reduction.

As described with reference to FIG. 1, the openings 107 provided by the present invention have particular utility when an accident involving the leaks of coolant from the pressure vessel occurs. However, this invention can also achieve satisfactory results during normal operation of a nuclear reactor.

As shown in FIG. 2, the fuel elements 104 are uniformly arranged in a grid pattern in each fuel assembly 15. Referring to FIG. 1, it will be seen that the fuel assemblies 15 are also arranged in a grid pattern in the core 14.

During normal operation of a nuclear reactor, a coolant is forcedly circulated to pass upwardly from the bottom of the pressure vessel 11 through the core 14 as shown in FIG. 1.

However, difficulty is experienced in maintaining a uniform arrangement of the fuel assemblies 15 disposed in the outer periphery of the core 14 so long as the spacing between the housing 20 and the fuel assemblies 15 remains as it is.

Generally, there is a considerable difference in the flow rate of coolant between the central portion of the core 14 and the outer periphery thereof which is near the housing 20. This non-uniformity in the flow rate of coolant causes variations in the effects achieved by the coolant as a moderator and in the reactivity thereof due to the voids generated, thereby causing non-uniformity of the core power.

The aforesaid non-uniformity of the flow rate of coolant is further enhanced by the tendency to provide an improvement in the core in order to increase a power output of the core of a boiling-water reactor.

Such improvement calls for successive replacements of the fuel assemblies 15 of one type by those of another type. As shown in FIG. 2, the fuel assemblies 15 each have forty-nine fuel elements 104 arranged in each channel 101 such that each row and each column consist of seven fuel elements 104 (hereinafter referred to as 7 × 7 fuel). In order to increase a power output of the nuclear reactor core, the current tendency is to replace the 7 × 7 fuel by fuel assemblies each having 64 fuel elements 104 arranged in each channel such that each row and each column consist of eight fuel elements 104 (hereinafter referred to as 8 × 8 fuel).

It will be readily appreciated that, if this arrangement is incorporated in the core 14, the flow rate of coolant passing through the 8 × 8 fuel will be lower than the flow rate of coolant passing through the 7 × 7 fuel. Thus, the distribution of the flow rate of coolant through the core 14 will become increasingly non-uniform.

Calculations performed by us have shown the following results:

(1) By reducing the total area of the openings 107 formed in each channel 101 of the 7 × 7 fuel by 2 to 3% as compared with that of the openings 107 formed in each channel of the 8 × 8 fuel so as to reduce differences in the resistance offered to the flow of coolant by the openings and allowing the coolant to get out of each channel through the openings 107, it is possible to render uniform the flow rate of coolant in the core in which two types of fuel exists side by side, thereby enabling the thermal characteristics of the nuclear reactor to be improved; and (2) The total area of the openings 107 can thus be brought within the range of between 1/10 and 1/5 of the total area of the through holes 105 in the upper tie plate 102 which is the range specifically set for the total area of the openings in the foregoing description.

The present invention has been described with reference to an embodiment in which water is used as a coolant. It is to be understood, however, that the invention is not limited to the use of water as a coolant, and that any chemically stable fluid having a relatively large thermal capacity can be used.

Also, in the embodiment shown and described herein, the openings 107 are described as being circular in shape. The invention is not limited to the openings of the circular shape, and the openings 107 may be rectangular, slot-shaped or of any other shape so long as they can perform the function of discharging vapor therethrough.

What is claimed is:

1. A nuclear reactor core comprising:
   a housing,
   upper and lower grid plates with a plurality of through holes, said upper and lower grid plates being secured in said housing, and
   first and second fuel assemblies held between said upper and lower grid plates, each of said first fuel assemblies having,
   an open-ended tubular first channel having channel walls
   upper and lower first tie plates with a plurality of through holes, said upper and lower first tie plates being secured near upper and lower open ends of the first channel, respectively,
   a plurality of first elongated fuel elements held between the upper and lower first tie plates, the first fuel element having a first clad tube and first fuel pellets packed therein, and
   first openings for bypassing vapor generated in the first channel, the first openings being disposed in said walls of the first channel just below the first upper tie plate, each of said second fuel assemblies having,
   an open-ended tubular second channel having channel walls,
   upper and lower second tie plates with a plurality of through holes, said upper and lower second tie plates being secured near the upper and lower open ends of the second channel, respectively,
   a larger number of second elongated fuel elements than that of first elongated fuel elements held between the upper and lower second tie plates, the second fuel element having a second clad tube and second fuel pellets packed therein, and
   second openings for bypassing vapor generated in the second channel, the second openings being disposed in said walls of the second channel just below the second upper tie plates, total area of the second openings of each second fuel assembly being larger than that of the first openings of each first fuel assembly.

2. The nuclear reactor core according to claim 1, wherein the total area of the first openings of each first fuel assembly is reduced by 2 to 3% compared to the total area of the second openings of each second fuel assembly.

3. The nuclear core according to claim 1, wherein the total area of each of the first and second openings is one-tenth to one-fifth of the total area of the through holes in the respective first and second upper tie plates.

4. A fuel assembly for a nuclear reactor core comprising:
   an open-ended tubular channel having channel walls;
   upper and lower tie plates with a plurality of through holes, said upper and lower tie plates being secured near upper and lower open ends of said channel, respectively;
   a plurality of elongated fuel elements held between said upper and lower tie plates, said fuel elements having a clad tube and fuel pellets packed therein; and
   a plurality of openings formed in the channel walls at a level between the upper tie plate and a top of the fuel pellets packed in the clad tube, wherein a total area of said openings is one-tenth to one-fifth of a total area of the through holes of said upper tie plate.

5. The fuel assembly for a nuclear reactor core according to claim 4, wherein each of said openings is round.

6. The fuel assembly for a nuclear reactor core according to claim 5, wherein said respective round openings have the same diameter and are arranged in the walls of the channel at the same level with a same interval.

7. In a nuclear reactor of the type comprising a reactor core provided with a plurality of fuel assemblies immersed in a coolant during operation of the reactor, and spray means for spraying coolant to the fuel assemblies upon failure of immersion of said fuel assemblies in the coolant, wherein the fuel assemblies each comprise an open-ended channel member having channel walls, upper and lower tie plates with a plurality of through holes, said tie plates being fixed to the channel walls, and a plurality of fuel elements with nuclear fuel pellets packed therein supported by the upper and lower tie plates, an improved reactor core wherein the improvement comprises:
   a plurality of openings disposed in the channel walls for bypassing from said channel member vapor generated from the coolant, said openings being disposed just below the upper tie plate and above the upper level of the fuel pellets, and said openings having a total area of one-tenth to one-fifth the total area of said through holes.

8. An improved nuclear reactor core according to claim 7, wherein said openings have the same diameter, are disposed at the same level, and are separated at the same interval.

9. In a nuclear reactor of the type comprising a reactor core provided with a plurality of fuel assemblies immersed in a coolant during operation of the reactor, and spray means for spraying coolant to the fuel assemblies upon failure of immersion of said fuel assemblies in said coolant, wherein said fuel assemblies each comprise an open-ended channel member having channel walls, upper and lower tie plates with a plurality of through holes, said tie plates being fixed to said channel walls, and a plurality of fuel elements supported by said upper and lower tie plates, an improved reactor core wherein the improvement comprises:
   a plurality of openings disposed in the channel walls for bypassing from the channel member vapor generated from the coolant, said openings being disposed just below the upper tie plate and having a total area of one-tenth to one-fifth the total area of said through holes.

* * * * *